US010735352B2

(12) United States Patent
Saito (10) Patent No.: US 10,735,352 B2
(45) Date of Patent: Aug. 4, 2020

(54) INFORMATION PROCESSING DEVICE, CONTROL METHOD FOR INFORMATION PROCESSING DEVICE, AND PROGRAM

(71) Applicant: LINE Corporation, Shibuya-ku, Tokyo (JP)

(72) Inventor: Nobuo Saito, Fukuoka (JP)

(73) Assignee: LINE CORPORATION, Tokyo (JP)

( * ) Notice: Subject to any disclaimer, the term of this patent is extended or adjusted under 35 U.S.C. 154(b) by 269 days.

(21) Appl. No.: 15/081,671

(22) Filed: Mar. 25, 2016

(65) Prior Publication Data

US 2017/0187653 A1 Jun. 29, 2017

(30) Foreign Application Priority Data

Dec. 29, 2015 (JP) .................................. 2015-257699

(51) Int. Cl.
*H04L 12/58* (2006.01)
*H04L 29/08* (2006.01)

(52) U.S. Cl.
CPC .............. *H04L 51/04* (2013.01); *H04L 51/24* (2013.01); *H04L 67/1044* (2013.01); *H04L 51/26* (2013.01)

(58) Field of Classification Search
CPC ..... H04L 51/04; H04L 67/1044; H04L 51/24; H04L 51/26
See application file for complete search history.

(56) References Cited

U.S. PATENT DOCUMENTS

| 9,473,428 B1* | 10/2016 | Koum ..................... H04M 3/02 |
| 9,935,792 B2* | 4/2018 | Benninger .............. H04L 51/04 |
| 2008/0028031 A1* | 1/2008 | Bailey .................... G06Q 10/10 |
| | | 709/207 |

(Continued)

FOREIGN PATENT DOCUMENTS

| JP | 2003433351 A | 10/2003 |
| JP | 2014115716 A | 6/2014 |
| JP | 2015064689 A | 4/2015 |

OTHER PUBLICATIONS

Office Action for corresponding Japanese Application No. 2015-257699 dated Nov. 15, 2016.

(Continued)

*Primary Examiner* — Umar Cheema
*Assistant Examiner* — James Ross Hollister
(74) *Attorney, Agent, or Firm* — Harness, Dickey & Pierce, P.L.C.

(57) ABSTRACT

An information processing device includes a reception unit that receives messages from terminals of a plurality of users constituting a group, a storage unit that stores reception times of the messages, a transmission unit that transmits the message, to a terminal of at least one user, a specification unit that specifies an unread message for which a reception time difference for a predetermined number of continuous messages, among a plurality of the unread messages, satisfies a predetermined condition, as a trigger message, based on the reception time of an unread message for which read information is not received from the terminal of the user, the read information indicating that the message has been viewed, and a generation unit that generates display information for displaying information regarding the trigger message on a display unit of the terminal of the user.

14 Claims, 9 Drawing Sheets

(56) References Cited

U.S. PATENT DOCUMENTS

| | | | | |
|---|---|---|---|---|
| 2009/0103695 A1* | 4/2009 | Katis | ........................ | H04L 51/04 |
| | | | | 379/93.01 |
| 2012/0023113 A1* | 1/2012 | Ferren | ................. | G06F 16/9535 |
| | | | | 707/751 |
| 2013/0046828 A1* | 2/2013 | Grewal | .................. | G06Q 10/10 |
| | | | | 709/204 |
| 2013/0226943 A1* | 8/2013 | Zheng | ..................... | H04L 51/22 |
| | | | | 707/755 |
| 2014/0047049 A1* | 2/2014 | Poston | .................... | H04L 51/32 |
| | | | | 709/206 |
| 2014/0344711 A1* | 11/2014 | Hallerstrom Sjostedt | ................... | |
| | | | | H04L 51/22 |
| | | | | 715/752 |
| 2016/0147387 A1* | 5/2016 | Rahman | ................ | G06F 3/0482 |
| | | | | 715/752 |
| 2017/0339119 A1* | 11/2017 | Li | ........................... | H04L 51/00 |

OTHER PUBLICATIONS

Written Opinion of International Search Authority for corresponding International Application No. PCT/JP2016/077299 dated Nov. 15, 2016.

* cited by examiner

INFORMATION PROCESSING DEVICE, CONTROL METHOD FOR INFORMATION PROCESSING DEVICE, AND PROGRAM

CROSS-REFERENCE TO RELATED APPLICATION

This application claims the benefit of Japanese Patent Application No. 2015-257699, filed on Dec. 29, 2015, in the Japanese Patent Office, the disclosure of which is incorporated herein in its entirety by reference.

BACKGROUND OF THE INVENTION

Field of the Invention

The present invention relates to an information processing device, a control method for an information processing device, and a program, which are related to a service system that exchanges a message between a plurality of user terminals constituting a group.

Background Art

In recent years, there have been many so-called services for chatting (messaging service) that exchange a message between a plurality of user terminals through a network. In this type of messaging service, users that use the service make up a group, and the users in the group can exchange messages (conversations) in real time.

Here, in a case where a user belonging to the group is not able to participate in the conversation in the group in real time, it is necessary to check the contents of the conversations which have been made in the group later. In a case where there are many unchecked messages, it takes effort to check all of the messages from the beginning. Further, in a case where the number of users in the group is large, and there are a plurality of groups which do not participate in the conversation, the number of unread messages increases, and it takes a lot of time to check. Therefore, if the user is able to know in advance the conversation to be checked preferentially with a high priority degree of importance in the group, such as a conversation at a timing when many conversations are frequently exchanged (the conversation becomes active) in the group, it is very convenient to the user.

To solve this problem, Japanese Unexamined Patent Application Publication No. 2003-288351 discloses a system that specifies a message having a strong relationship with many messages as valuable knowledge, by using means for extracting the type and strength of the relationship between respective messages, for each of a plurality of messages, based on the history of operations performed by a plurality of users and the similarity of the contents between the messages.

SUMMARY OF THE INVENTION

However, in Japanese Unexamined Patent Application Publication No. 2003-288351, chats within a group are not assumed. In a case of a chat, many chats do not have a specification that allows a reply to a certain message, and as described in Japanese Unexamined Patent Application Publication No. 2003-288351, it is not possible to use the operation made by the user (replying, deleting, forwarding, or the like) for the message.

The present invention is contrived in view of the above problem, and an object thereof is to provide an information processing device, a control method for an information processing device, and a program, which are related to a service system capable of notifying the user of information regarding an unread message with a high degree of importance, which triggers the users in the group to frequently exchange conversations, in a case where there are a plurality of unread messages in a chatting service.

According to an aspect of the present invention, there is provided an information processing device, including: a reception unit that receives messages addressed to a plurality of users constituting a group, from terminals of the plurality of users constituting the group; a storage unit that stores reception times of a plurality of messages which are received by the reception unit, in association with the messages; a transmission unit that transmits the message, to a terminal of at least one user included in the group; a specification unit that specifies an unread message for which a reception time difference for a predetermined number of continuous messages, among a plurality of the unread messages, satisfies a predetermined condition, as a trigger message, based on the reception time of an unread message for which read information is not received from the terminal of the user, the read information indicating that the message has been viewed; and a generation unit that generates display information for displaying information regarding the trigger message on a display unit of the terminal of the user, wherein the transmission unit transmits display information that is generated by the generation unit, to the terminal of the user.

In the information processing device according to the aspect of the present invention, the specification unit may calculate a first average value that is an average value before an unread message, and a second average value that is an average value after the unread message, for each of a plurality of unread messages, the average value being an average value of reception time differences for the predetermined number of continuous messages, and specify an unread message for which the first average value is greater than the second average value, and a difference between the first average value and the second average value is the largest value, as a trigger message.

In the information processing device according to the aspect of the present invention, the specification unit may calculate a first average value that is an average value before an unread message, and a second average value that is an average value after the unread message, for each of a plurality of unread messages, the average value being an average value of reception time differences for the predetermined number of continuous messages, and specify an unread message, for which the ratio of the second average value relative to the first average value is the smallest value, as a trigger message.

In the information processing device according to the aspect of the present invention, the specification unit may calculate a ratio of the number of messages that are received within a predetermined time after receiving the unread message relative to the number of messages that are received within a predetermined time before receiving the unread message, for each unread message, and specify an unread message for which the ratio is the smallest value, as a trigger message.

In the information processing device according to the aspect of the present invention, the storage unit may further store information on a user who transmits a message in association with the message, and the specification unit may use one message among messages that are transmitted continuously from the same user for the calculation, when specifying the trigger message.

According to another aspect of the present invention, there is provided a control method for an information processing device, the control method including: receiving messages addressed to a plurality of users constituting a group, from terminals of the plurality of users constituting the group; storing reception times of a plurality of messages which are received in the receiving, in association with the messages; transmitting the message, to a terminal of at least one user included in the group; specifying an unread message for which a reception time difference for a predetermined number of continuous messages, among a plurality of the unread messages, satisfies a predetermined condition, as a trigger message, based on the reception time of an unread message for which read information is not received from the terminal of the user, the read information indicating that the message has been viewed; generating display information for displaying information regarding the trigger message on a display unit of the terminal of the user; and transmitting display information that is generated in the generating, to the terminal of the user.

In the control method for an information processing device according to the another aspect of the present invention, in the specifying, a first average value that is an average value before an unread message, and a second average value that is an average value after the unread message, for each of a plurality of unread messages, the average value being an average value of reception time differences for the predetermined number of continuous messages may be calculated, and an unread message for which the first average value is greater than the second average value, and a difference between the first average value and the second average value is the largest value, as a trigger message may be specified.

In the control method for an information processing device according to the another aspect of the present invention, in the specifying, a first average value that is an average value before an unread message, and a second average value that is an average value after the unread message may be calculated, for each of a plurality of unread messages, the average value being an average value of reception time differences for the predetermined number of continuous messages, and an unread message, for which the ratio of the second average value relative to the first average value is the smallest value, as a trigger message may be specified.

In the control method for an information processing device according to the another aspect of the present invention, in the specifying, a ratio of the number of messages that are received within a predetermined time after receiving the unread message relative to the number of messages that are received within a predetermined time before receiving the unread message may be calculated for each unread message, and an unread message for which the ratio is the smallest value may be specified as a trigger message.

In the control method for an information processing device according to the another aspect of the present invention, in the storing, information on a user who transmits a message in association with the message may further be stored, and in the specifying, one message among messages that are transmitted continuously from the same user may be used for the calculation, when specifying the trigger message.

According to a still another aspect of the present invention, there is provided a non-transitory computer readable recording medium having a program causing an information processing device to realize the following functions of: receiving messages addressed to a plurality of users constituting a group, from terminals of the plurality of users constituting the group; storing reception times of a plurality of messages which are received in the reception function, in association with the messages; transmitting the message to a terminal of at least one user included in the group; specifying an unread message for which a reception time difference for a predetermined number of continuous messages, among a plurality of the unread messages, satisfies a predetermined condition, as a trigger message, based on the reception time of an unread message for which read information is not received from the terminal of the user, the read information indicating that the message has been viewed; and generating display information for displaying information regarding the trigger message on a display unit of the terminal of the user, and display information, that is generated by the generation function, is transmitted to the terminal of the user, by the transmission function.

According to the present invention, it is possible to provide an information processing device, a control method for an information processing device, and a program, which are related to a service system capable of notifying the user of information regarding an unread message with a high degree of importance, which triggers the users in the group to frequently exchange conversations, in a case where there are a plurality of unread messages in a chatting service, and thus they are very convenient to the user.

DETAILED DESCRIPTION OF THE INVENTION

Compliance with Secrecy of Communication

In a case of implementing the invention described herein, it should be noted that the invention is implemented in a condition of compliance with legal matters relating to secrecy of communication.

Figure 9:
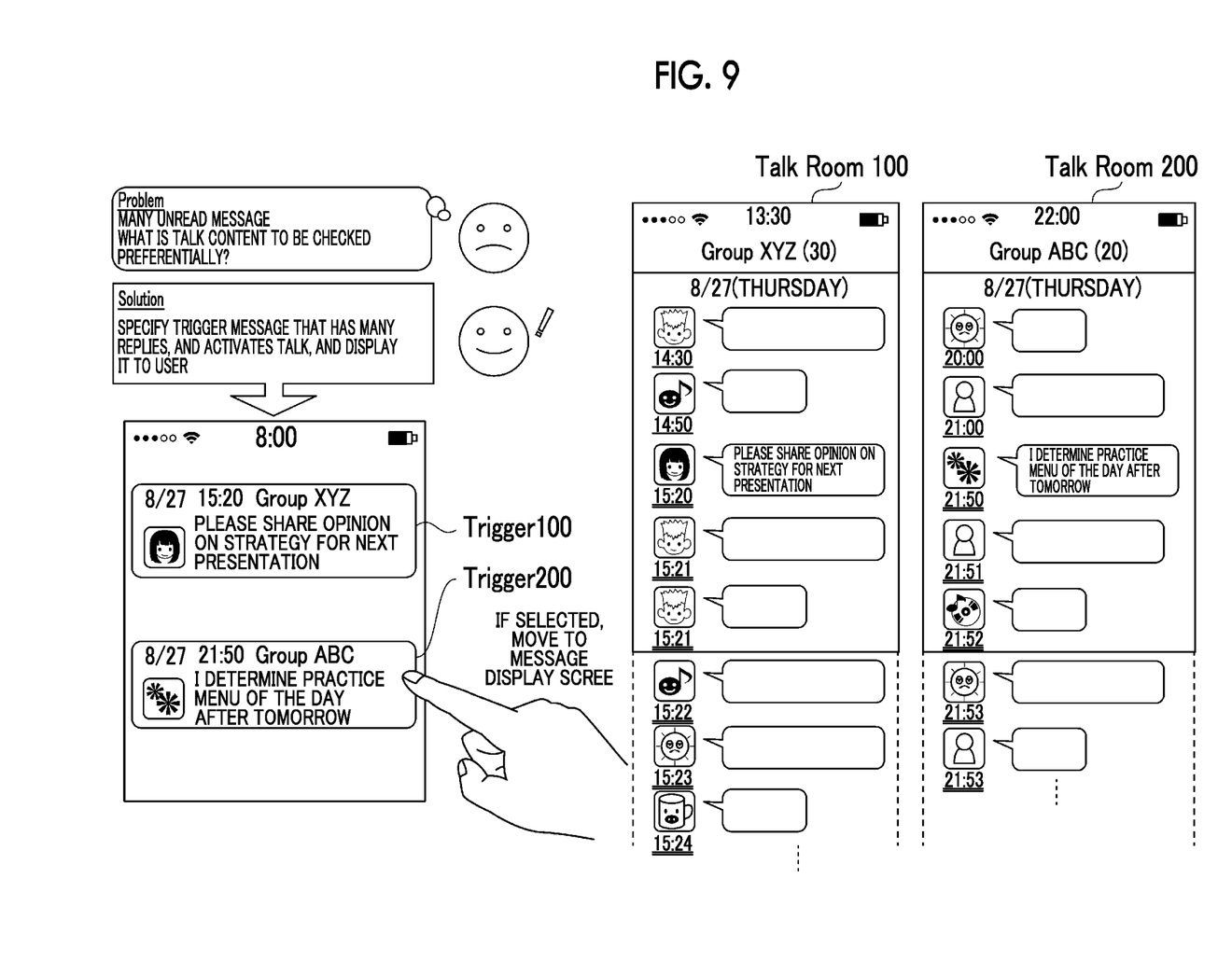
FIG. 9 is a schematic diagram illustrating the outline of the present invention.

Hereinafter, an embodiment of the present invention will be described with reference to various drawings. FIG. 9 is a schematic diagram illustrating the outline of the present invention. As described above, in a case where the user does not participate in the conversation in a group in real time, there is a problem that there are many unchecked messages (unread messages). Therefore, it is convenient if the user can determine the conversation to be preferentially checked, among the unchecked conversations. According to an embodiment of the present invention, a message, which triggers conversations to be frequently exchanged (makes the conversations active), is specified as a trigger message, based on a predetermined condition about the time when each user transmits the message. Then, information about the trigger message is displayed on the terminal device of the user. Therefore, the user is able to immediately know the conversation to be preferentially checked, among unread messages. Here, "conversation" is used as the meaning of "exchange of messages", and "statement" and "posting" are used as the meaning of "transmission of a message by the user".

In the example of FIG. 9, trigger message displays Trigger100 and Trigger200 are displayed on the display screen of the user. The trigger messages are messages that are respectively extracted from the conversations displayed on the message display screens TalkRoom100 and TalkRoom200. For example, in TalkRoom100, there are statements at "14:30", "14:50", and "15:20" at an interval of 20 minutes or more, but there are frequent statements at "15:21", "15:21", "15:22" at an interval of one minute or less after "15:20". In other words, the statement ("Please share opinion on strategy for the next presentation") at "15:20" is a statement that triggers the frequent exchange of messages by the users in the group, and is a statement having a high priority to the users who do not participate in the conversation in real time. Also in the message display screen TalkRoom200, after the statement at "21:50" ("I determined a practice menu of the day after tomorrow"), statements are frequently performed in the group, and the statement at "21:50" is a statement having a high priority.

The information of the trigger message such as a group name in which conversations including the trigger message are made, the image of the speaker of the trigger message, the statement time, and the statement content are displayed on the trigger message display. For example, the trigger message display Trigger100 indicates a statement which is made in a conversation between users in a group named "Group XYZ", at "15:20" on "8/27", and a statement such as "Please share opinion on strategy for the next presentation". In addition, the trigger message display Trigger200 indicates a statement which is made in a conversation between users in a group named "Group ABC", at "21:50" on "8/27", and a statement such as "I determined a practice menu of the day after tomorrow".

In addition, the trigger message display may be displayed in a selectable manner by the user. For example, in FIG. 9, the terminal device of the user is a smart phone, and the user is able to display the conversation content including the trigger message, by tapping trigger message displays Trigger100 and Trigger200 that are displayed on the display screen. The message display screen TalkRoom100 is a display screen of the user terminal in a case where the trigger message display Trigger100 is selected. Furthermore, the message display screen TalkRoom200 is a display screen in a case where the trigger message display Trigger200 is selected. In addition, as illustrated, in a messaging service according to an embodiment of the present invention, conversations in the group are displayed in time series, for each group. In this case, in order to indicate which user makes a statement, a balloon displaying the message is displayed near the icon of the speaker. The icon can be set freely by each user. The above description is the outline of the present invention.

Figure 1:
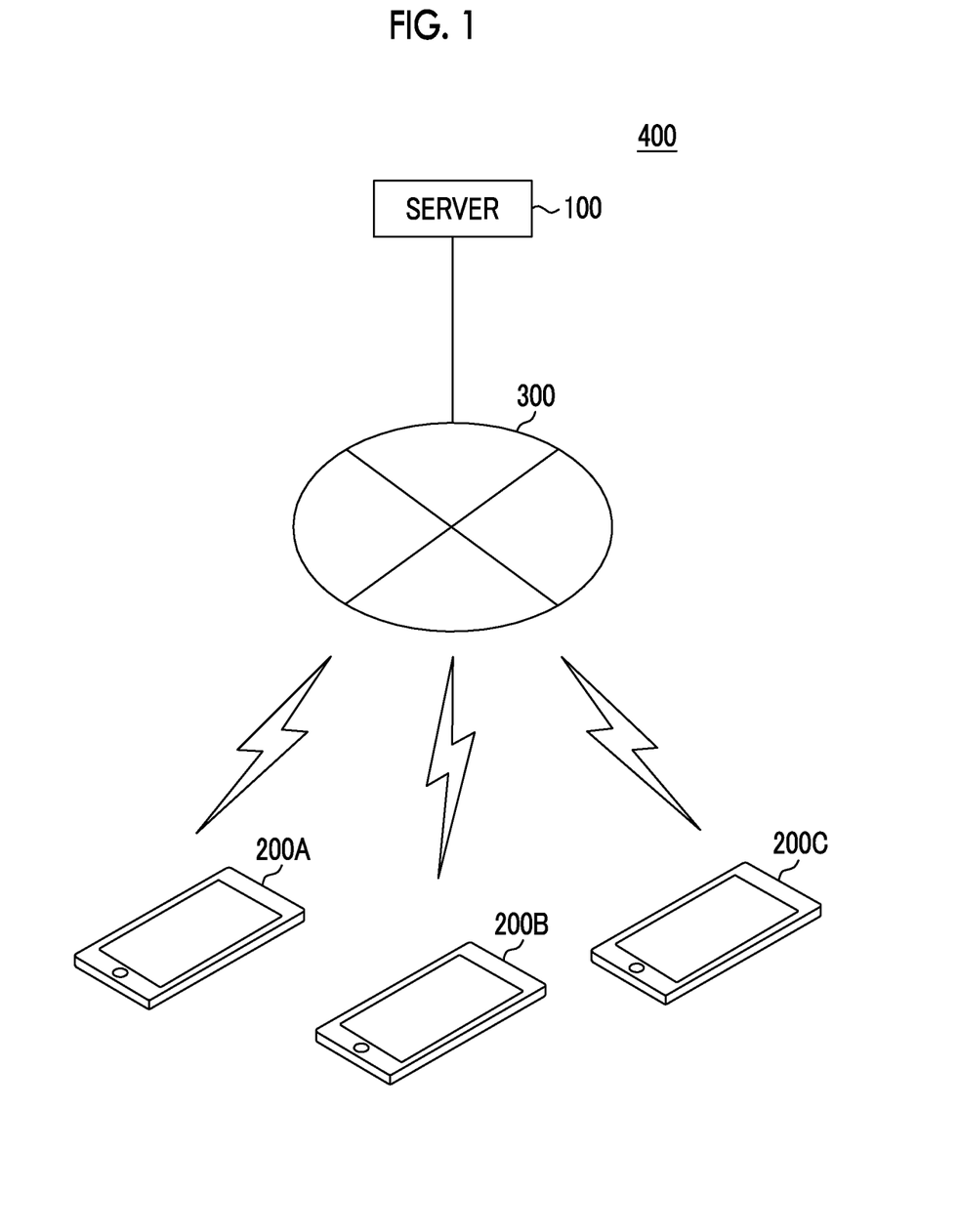
FIG. 1 is a schematic diagram of a configuration of a service system according to an embodiment of the present invention.

FIG. 1 is a schematic diagram of a configuration of a service system according to an embodiment of the present invention. As illustrated in FIG. 1, a service system 400 includes a server 100, terminal devices 200A to 200C, and a network 300. The server (information processing device) 100 is connected to the terminal devices 200A to 200C through the network 300. In addition, in FIG. 1, only three terminal devices are illustrated for each explanation, but it is needless to say that more terminal devices may be present.

The terminal devices 200A to 200C are communication terminals, a typical example of which is the smartphone. The terminal device 200A to the terminal device 200C perform the chat which is a part of the service according to an embodiment of the present invention, by using a messaging application which is provided from a service provider (hereinafter, abbreviated as "message app"). In addition, it is assumed that the terminal devices 200A, 200B, 200C and a plurality of other terminal devices, which are not illustrated, form a group, and messages are exchanged in the group. In this case, if a message is transmitted from a certain terminal device (for example, the terminal device 200A) to a group, the message is transmitted to other terminal devices in the group other than the terminal device 200A. In other words, the server 100 plays a function to relay the communication between terminal devices, to receive the message transmitted from the terminal device 200A through the network 300, and transmit the message to the terminal devices 200B and 200C, or to receive the message transmitted from the terminal device 200B through the network 300, and transmit the message to the terminal devices 200A and 200C. In addition, the server 100 receives information about the operation instruction content that the user inputs through the input receiving units of the terminal devices 200A to 200C, and performs the process corresponding to the instruction content.

In addition, the terminal device 200A may belong to a group that does not include the terminal devices 200B, 200C. In other words, each terminal device and other terminal devices can form a plurality of groups.

Figure 2:
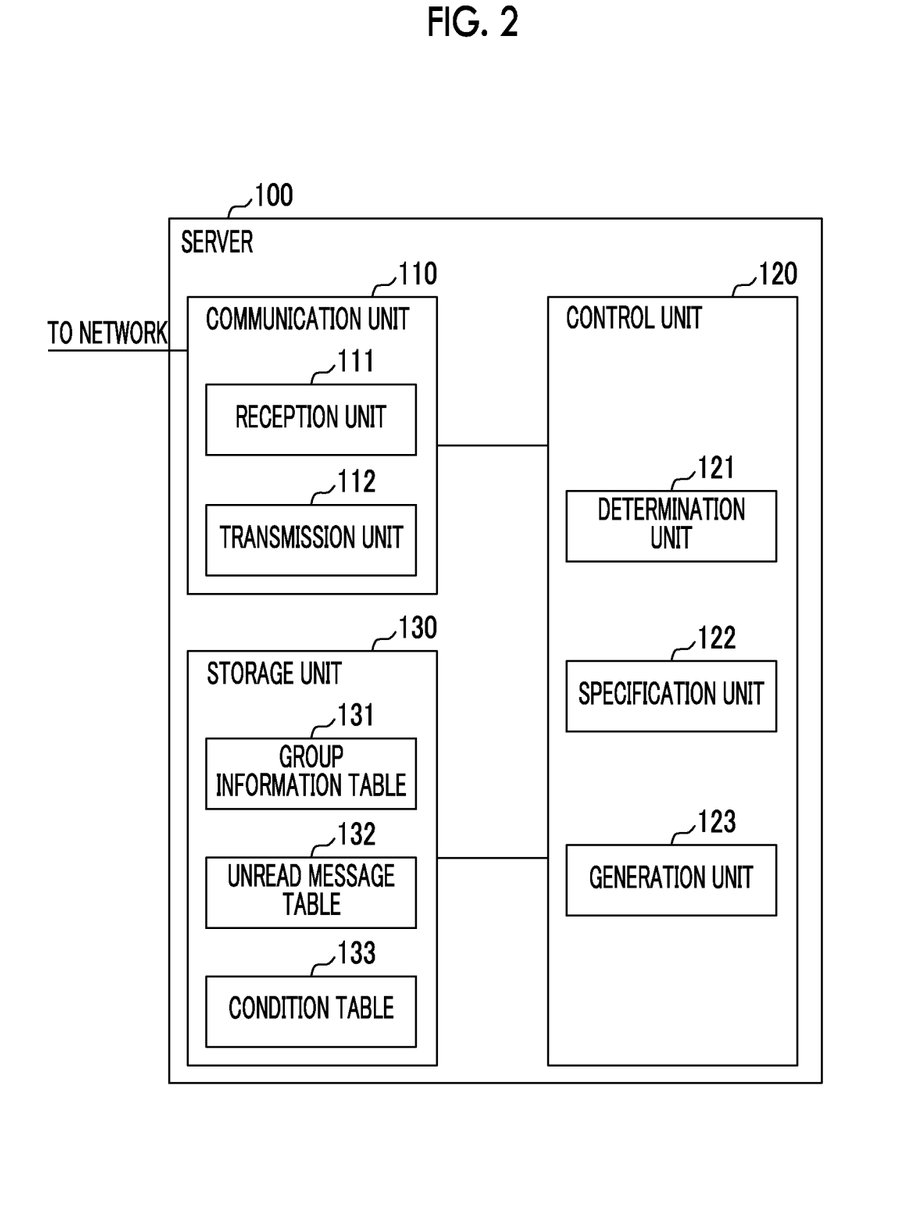
FIG. 2 is a block diagram of an information processing device (server) according to the embodiment of the present invention.

FIG. 2 is a block diagram of a server 100 according to an embodiment of the present invention. As illustrated in FIG. 2, the server 100 includes a communication unit 110, a control unit 120, and a storage unit 130. The details will be described later, but the function of each unit will be briefly explained.

The communication unit 110 includes a reception unit 111, and a transmission unit 112, and has a function of performing communication (transmission and reception of various types of data and messages) with the terminal devices 200A to 200C of the users, through the network 300, according to the instruction from the control unit 120. The communication may be performed in a wired manner, or a wireless manner, and if the mutual communication can be executed, any communication protocol may be used. Here, the message is not limited to the text message, and includes images, audio, videos, stamps (digital stickers), and the like.

The reception unit 111 receives a message addressed to a plurality of users forming a group from the terminals of the plurality of users forming a group. The transmission unit 112 transmits, to the terminal device of one user included in the group, a message addressed to the plurality of users forming a group, which is transmitted from another user of the group. In other words, in a case where a message is transmitted to the group, from another terminal device of the group including the terminal device 200A, the transmission unit 112 transmits the message to the terminal device 200A and the other terminal devices of the group. Furthermore, the transmission unit 112 transmits display information, which will be described later, to the terminal device.

The reception unit 111 receives read information indicating that a message is read by the user, that is, the message is viewed by the user, from the terminal of the user. Here, "read" refers to the display unit displaying a screen that displays the message, in the terminal device that receives the message. On the contrary, "unread" refers to a state in which a screen that displays the message is not displayed once, in the terminal device. In a case where the screen that displays the received message is displayed on the display unit, the terminal device generates read information, and transmits the read information to the server 100. In this manner, since the server 100 is capable of determining whether or not the message transmitted to the terminal device of the user is displayed, it is possible to specify the trigger message described above, only with respect to the unread message of the user.

The control unit 120 is a processor having a function to control each unit of the server 100. The control unit 120 includes a determination unit 121, a specification unit 122, and a generation unit 123.

The determination unit 121 performs various determination processes. The specification unit 122 performs various types of calculation required for specifying a trigger message. For example, the specification unit 122 calculates the reception time difference between unread messages, based on the reception time of the unread message in the reception unit 111 for which the read information is in an unreceived state. Here, "unread message" refers to a message for which the read information described above is not transmitted from the user to the server, among the messages transmitted to the user. The specification unit 122 specifies the unread message for which a reception time difference of a predetermined number of continuous messages, among a plurality of unread messages, satisfies a predetermined condition, based on the reception time of the unread message for which the read information is not received from the terminal of one user as a trigger message. The predetermined condition will be described later. The generation unit 123 generates display information for displaying information about the trigger message on the display unit of the terminal of the user. In addition, in a case where the trigger message is selected by the user, the generation unit 123 may generate the display information such that the conversation content including the trigger message is displayed in time series on the display unit of the terminal of the user.

The storage unit 130 is typically realized by various recording mediums such as a hard disc drive (HDD), a solid state drive (SSD), and a flash memory, and has a function of storing various programs and various types of data which are required for the operation of the server 100. The storage unit 130 stores (saves) information about a group (group information table 131), predetermined conditions (condition table 133) which are required for specifying the trigger message, and the like. In addition, the storage unit 130 is realized by, for example, a random access memory (RAM), and includes a memory functioning as a work memory of the control unit 120. The memory stores temporary data (unread message table 132), and the like. The various types of data stored in the storage unit 130 may be stored in the storage unit 130, after being temporarily stored in the memory.

Figure 3:
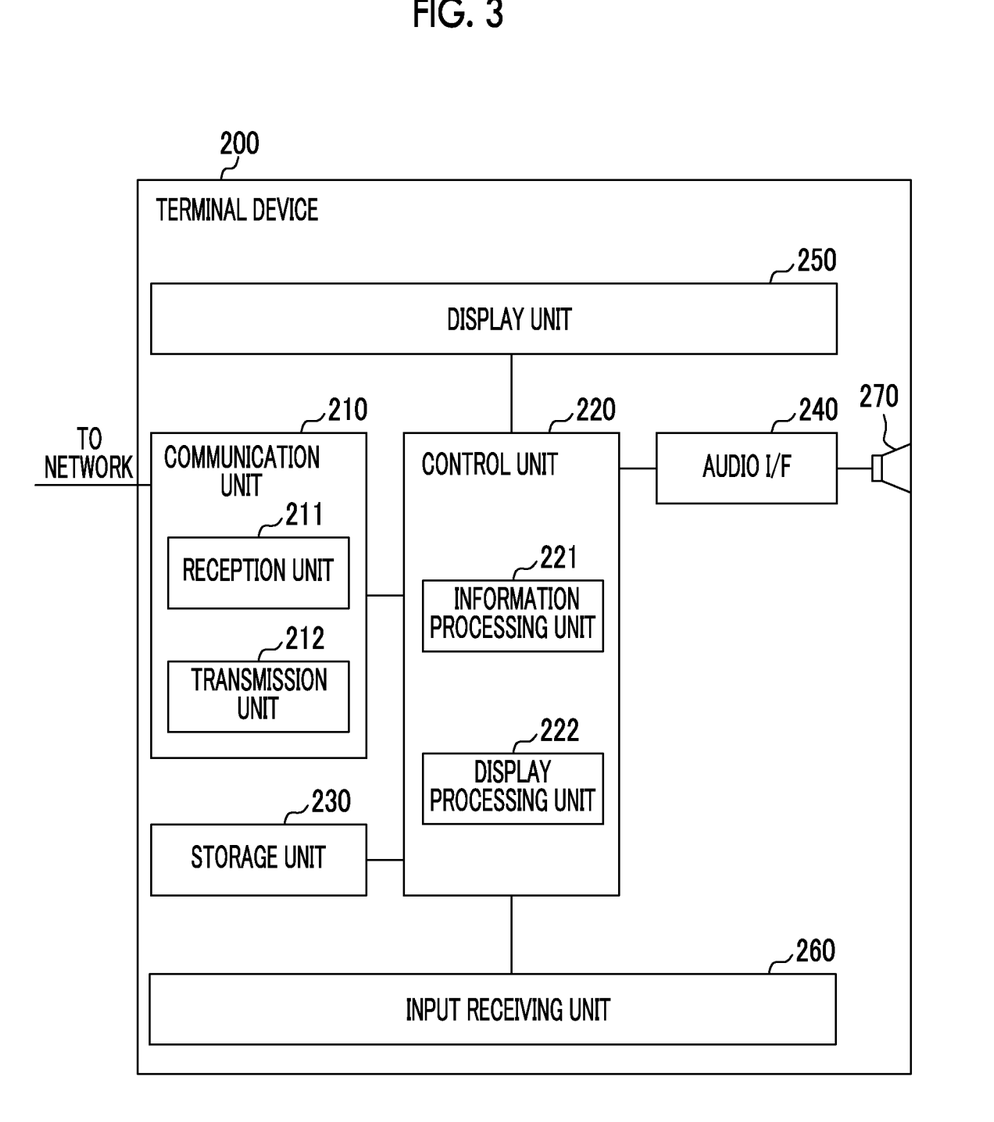
FIG. 3 is a block diagram of a terminal device according to the embodiment of the present invention.

Next, the terminal device 200 will be described. FIG. 3 is a block diagram of the terminal device 200 according to the embodiment of the present invention. As illustrated in FIG. 3, the terminal device 200 includes a communication unit 210, a control unit 220, a storage unit 230, an audio interface (I/F) 240, a display unit 250, an input receiving unit 260, and a speaker 270.

The communication unit 210 includes a reception unit 211 and a transmission unit 212, and has a function of executing communication with the server 100, through the network 300. The communication may be performed in a wired manner, or a wireless manner, and if the mutual communication can be executed, any communication protocol may be used.

The control unit 220 is a processor having a function to control each unit of the terminal device 200. The control unit 220 includes an information processing unit 221, and a display processing unit 222. The information processing unit 221 has a function of performing control so as to transmit information (message or the like) from the communication unit 210 to the server 100, according to the information that is input from the input receiving unit 260. Further, the information processing unit 221 also has a function of transmitting the information received from the server 100 in the communication unit 210, to the display processing unit 222. The display processing unit 222 has a function to convert the data for display that has been transmitted from the information processing unit 221 into pixel information, and write the pixel information to the frame buffer of the display unit 250. In addition, in a case where the display screen of the message received from the server 100 is displayed on the display unit 250, the information processing unit 221 generates the read information for the message, and transmits the read information to the server 100 through the transmission unit 212.

The storage unit 230 has a function of storing various programs and various types of data which are required for the operation of the terminal device 200. For example, the storage unit 230 includes information about a program such as a message application used to receive the service according to the present embodiment. Incidentally, the storage unit 230 is typically realized by various recording media such as an HDD, an SSD, and a flash memory.

The display unit 250 is a monitor having a function for displaying an image, according to display data written to the frame buffer by the display processing unit 222, and is typically realized by a liquid crystal display. The display unit 250 displays a message application screen which is provided from a service provider and is stored (saved) in the storage unit 230. Further, the display unit 250 displays the notifications that are sent from the server 100. The audio I/F 240 is the speaker 270 or an earphone interface which is not illustrated. The speaker 270 may be set so as to emit a notification sound, in a case of receiving the notification from the server 100. In a case where a video is transmitted as a message, the sound of the video is output.

The input receiving unit 260 receives an input from the user, and transmits the information relating to the input to the control unit 220. In the terminal device 200, the input receiving unit 260 is implemented by a touch panel or the like, detects the contact and the contact position thereof by the user's finger or a pointing device such as a stylus, and transmits the coordinates of the contact position to the information processing unit 221. In this embodiment, the input receiving unit 260 receives the input of the message by the user, and the selection for the notification that is received from the server 100.

Figure 4:
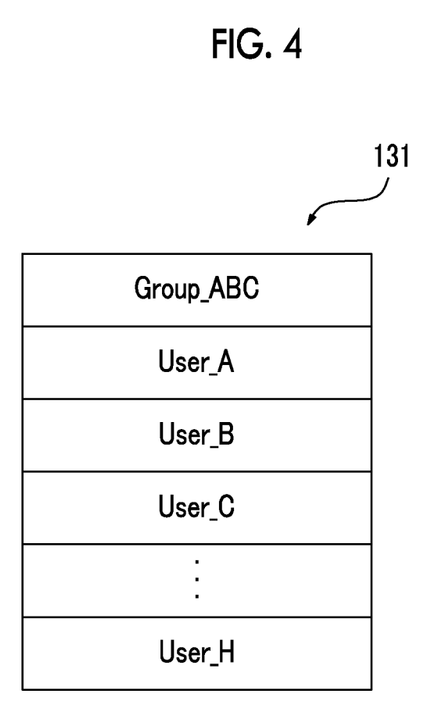
FIG. 4 is an example of group information stored in a storage unit.

Next, each piece of information that is stored in the storage unit 130 of the server 100 will be described with reference to the drawings. FIG. 4 is a diagram illustrating an example of a group information table 131 stored in the storage unit 130. As illustrated, the group information table 131 stores the user IDs (IDentifier) of the users included in the group. Here, "user ID" is identification information of a user that is assigned to each user by a service provider. In the illustrated example, it is understood that the users of "User_A", "User_B", . . . , and "User_H" are included in a group named "Group_ABC". Further, FIG. 4 illustrates only one group, but it goes without saying that a plurality of groups may be present, the information thereof may be stored, or the user may belong to a plurality of groups.

Figure 5:
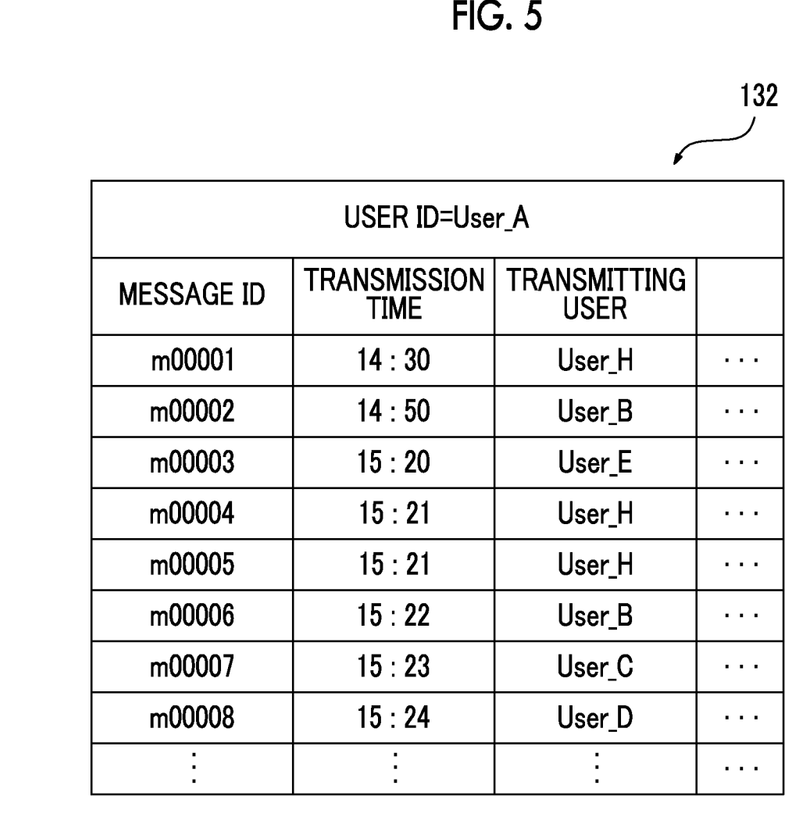
FIG. 5 is an example of unread message information stored in the storage unit.

FIG. 5 is an example of the unread message table 132 stored in the storage unit 130. The illustrated example is a table relating to the message that another user of a group "Group_ABC" transmits to the group, here, the user A (the user of the terminal device 200A) of the user ID "User_A" belongs to the group "Group_ABC". The unread message table 132 is generated for a message that is transmitted to the user A, but for which read information is not transmitted from the terminal device 200A of the user A, and stores message IDs, transmission times, transmitting users, and the like. In addition, the same unread message table 132 is stored for all other users of the group.

If the unread message table 132 of FIG. 5 is referred to, it can be seen that the read information is not received from the terminal device 200A, for the message of the message ID "m00001". Here, it can be seen that the "transmitting user" is "User_H" and the transmission time is "14:30" for the message of the message ID "m00001". In addition, it can be seen that after the message of the message ID "m00003", the transmission time is less than one minute, and messages are frequently transmitted.

The condition table 133 relates to a predetermined condition which is used in specifying the trigger message from a plurality of unread messages. Hereinafter, the condition for specifying the trigger message will be described with reference to the drawings.

Figure 6A:
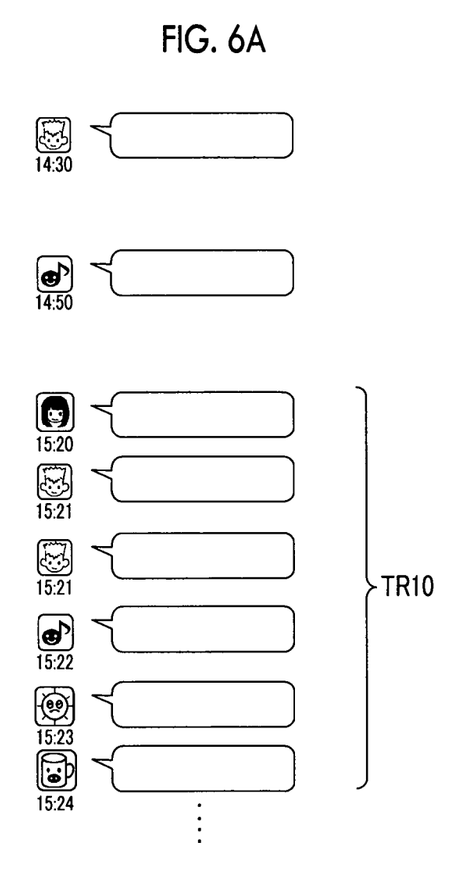
FIGS. 6A and 6B are schematic diagrams illustrating the embodiment of the present invention.
Figure 6B:
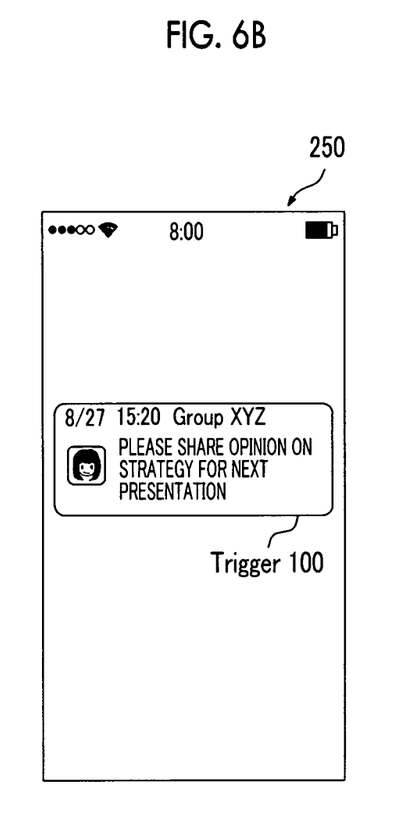

FIGS. 6A and 6B are diagrams illustrating an embodiment of the present invention. In addition, FIGS. 6A and 6B correspond to the unread message table 132 of FIG. 5. FIG. 6A illustrates the unread messages of the user A which are displayed in time series, and indicates the statement by the group users other than the user A as a balloon-like shape. In addition, the time that is displayed at the bottom of the icon indicates the post time of a message. In addition, in the example of FIG. 6A, for the purpose of explanation, the interval between balloons is displayed to correspond to the posted time.

In the examples of FIG. 6A, as an unread message, messages are sent at intervals of 20 minutes or more at 14:30, 14:50, and 15:20, and there is a message group TR10 in which messages are sent at an interval of less than one minute after 15:20. The determination unit 121 of the server 100 determines whether or not read information is received from the terminal device 200A, with respect to the message which is transmitted to the terminal device 200A, and stores information of each message (transmission time, transmitting user, or the like) in the unread message table 132, in a case where the read information is not received. The specification unit 122 specifies a trigger message, based on the unread message table 132 stored in the storage unit 130.

The generation unit 123 generates display information for displaying the display about a trigger message on the display unit 250 of the terminal device 200A. FIG. 6B is a diagram illustrating an example of a trigger message display that is displayed on the display unit 250. In a trigger message display Trigger100, the date and time when the conversation including a trigger message has been made, a group name, the content of the trigger message ("Please share opinions on the strategy for next presentation"), and the icon of a speaker are displayed. In addition, this trigger message display is generated so as to be selected by the user A, and a list of unread messages including the trigger message can be displayed on the display unit 250, by the user A by tapping and selecting, for example, the trigger message display. In this case, the generation unit 123 may generate, for example, information which is designed such that the oldest message (message that is received at the earliest time) and the newest message (message that is received recently) are not displayed, but rather the trigger message is displayed on the display unit 250, among the unread messages, and transmit the information on the terminal device 1:00A. In addition, for example, the trigger message display may be pop-up displayed, or may be displayed on the message display screen of the message app.

The specification of the above-mentioned trigger message is performed as follows. For example, the specification unit 122 calculates a first average value that is an average value before a certain unread message, and a second average value that is an average value after the unread message, for each of the plurality of unread messages, here, both average values are average values of reception time differences for a predetermined number of continuous messages. An unread message for which the first average value is greater than the second average value and a difference between the first average value and the second average value is the largest value can be specified as the trigger message. This will be described with reference to FIG. 7.

Figure 7:
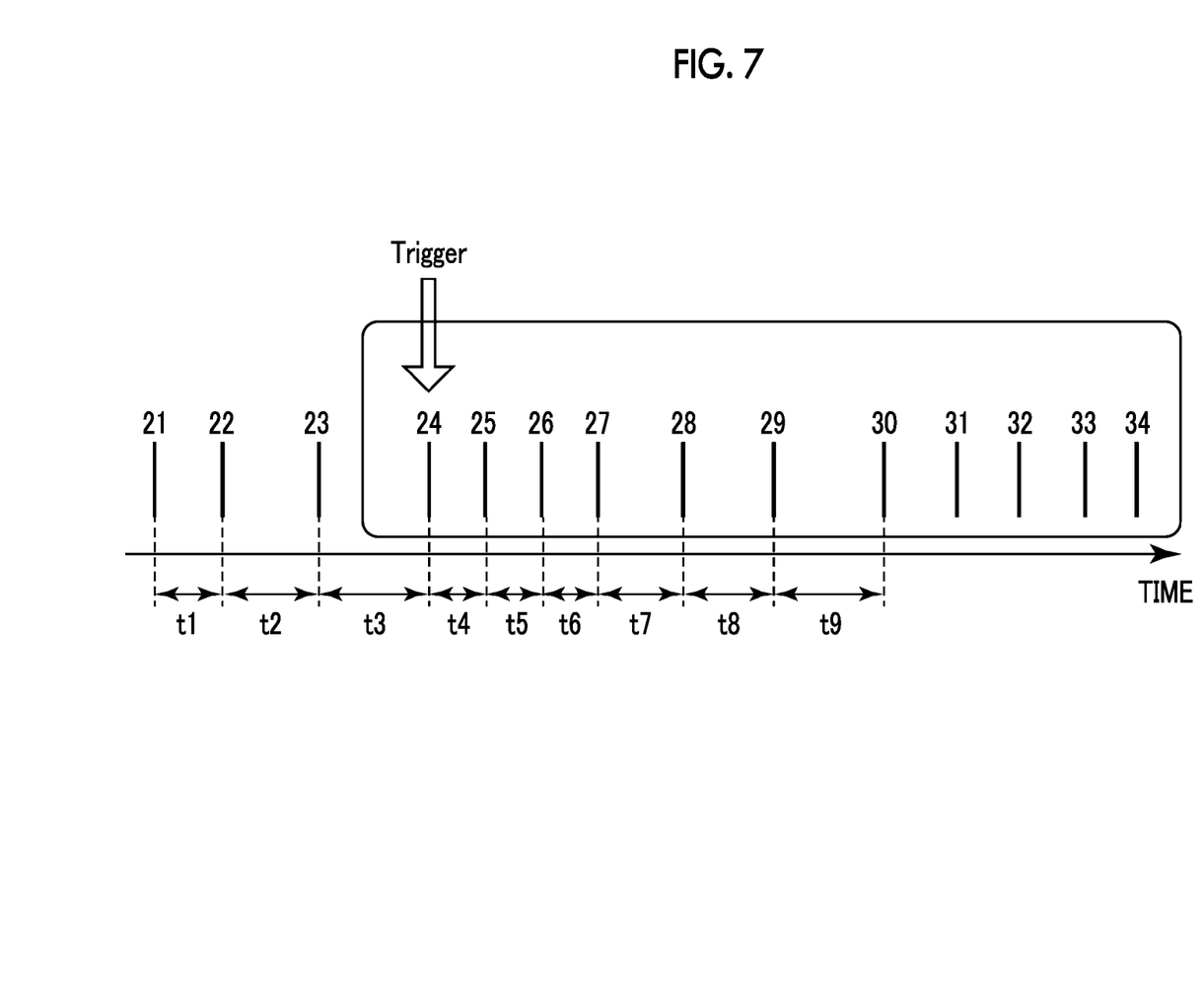
FIG. 7 is a schematic diagram illustrating the embodiment of the present invention.

FIG. 7 is a schematic diagram illustrating a predetermined condition for specifying the trigger message. In FIG. 7, the horizontal axis represents time, and a plurality of vertical lines are messages that are received by the server 100 at certain times. Further, in FIG. 7, messages 21 to 23 are read messages in which read information is transmitted from the user, and the message 24 and the subsequent messages that are surrounded by a rectangle are unread messages.

The specification unit 122 calculates a reception time difference between respective messages. For example, a reception time difference t1 between a message 21 and a message 22, a reception time difference t2 between the message 22 and a message 23, and the like are calculated. The specification unit 122 calculates an average value (first average value) of the reception time differences for a predetermined number of messages which are received before the unread message, and an average value (second average value) of the reception time differences for a predetermined number of messages which are received after the unread message, for each of unread messages 24 to 34. The "predetermined number" is determined according to the number of unread messages, and is described as, for example, "3". The specification unit 122 calculates the average value (first average value) of the reception time differences t1, t2, and t3, for three messages 21 to 23 which are received before the unread message 24. In other words, the first average value (message 24)=(t1+t2+t3)/3. The specification unit 122 calculates the average value (second average value) of the reception time differences t4, t5, and t6, for three messages 25 to 27 which are received after the unread message 24. In other words, the second average value (message 24)=(t4+t5+t6)/3. The specification unit 122 calculates the above-mentioned average value for other respective unread messages 25 to 34. Then, the determination unit 121 determines for each unread message, whether or not the first average value is larger than the second average value, in other words, determines whether or not an interval to receive the message is longer, in a period before receiving the unread messages, as compared with a period after receiving a certain unread message. Further, the specification unit 122 calculates the difference between the first average value and the second average value for each unread message, and the determination unit 121 determines whether or not the value of the difference becomes the largest value, in other words, determines whether or not an interval to receive a message significantly changes, based on the reception of a certain unread message. As a determination result, the unread message for which the first average value is greater than the second average value, and the difference between the first average value and the second average value becomes the largest value is specified as the trigger message, by the specification unit 122. In the example of FIG. 7, the message 24 is specified as the trigger message. As described above, the information on the read messages 21 to 23 may be used for calculating reception time difference. The information on the read message is stored in the storage unit 130.

Thus, it is possible to specify the trigger message having the higher priority of checking, through a simple calculation process using the reception time of a message.

Modification Example 1

In addition, a predetermined condition different from the above-mentioned condition may be used for specifying a trigger message. For example, the specification unit 122 may specify an unread message for which the ratio of the second average value relative to the above-mentioned first average value is the smallest value, as a trigger message. In other words, in this condition, the unread message for which an interval to receive the message is longer, in a period before receiving the unread messages, as compared with a period after receiving a certain unread message, and the ratio of intervals to receive the message that changes based on the reception of a certain unread message is the largest, can be specified through a simpler process in which the load of the determination process is reduced.

Modification Example 2

In addition, the specification unit 122 may calculate the ratio of the number of messages that are received within a predetermined time after receiving the unread message relative to the number of messages that are received within a predetermined time before receiving the unread message, for each unread message, and specify an unread message for which the ratio is the smallest value, as a trigger message. According to this condition, before and after a certain unread message, it is possible to specify an unread message for which the number of messages that are received within a predetermined time (for example, 100 seconds) rapidly increases. In addition, a predetermined time is determined according to the number of unread messages, and a time during which messages are unread.

In addition, the present invention can also be applied to a case where a plurality of unread messages are present (for example, 30 or more). In addition, in a case where the number of unread messages is small and all of the unread messages are displayed on the display screen, the trigger message specifying process described above may not be executed. In this case, a lower limit is stored in the storage unit 130, and if it is determined that the number of unread messages exceeds the lower limit by the determination unit 121, the trigger message specifying process described above may be performed.

Modification Example 3

The above description has been made regarding the aspect in which all the messages that have been received by the server 100 are used in the trigger message specifying process by the specification unit 122. However, it is not preferable that the first statement is specified as the trigger message, in continuous statements for a short time by the same user, which are posted by a certain person about a certain topic several times. Therefore, the specification unit 122 may use one message among the messages that are transmitted continuously from the same user in the specifying process, by using the information (user ID) of the statement user that is stored in the storage unit 130.

Figure 8:
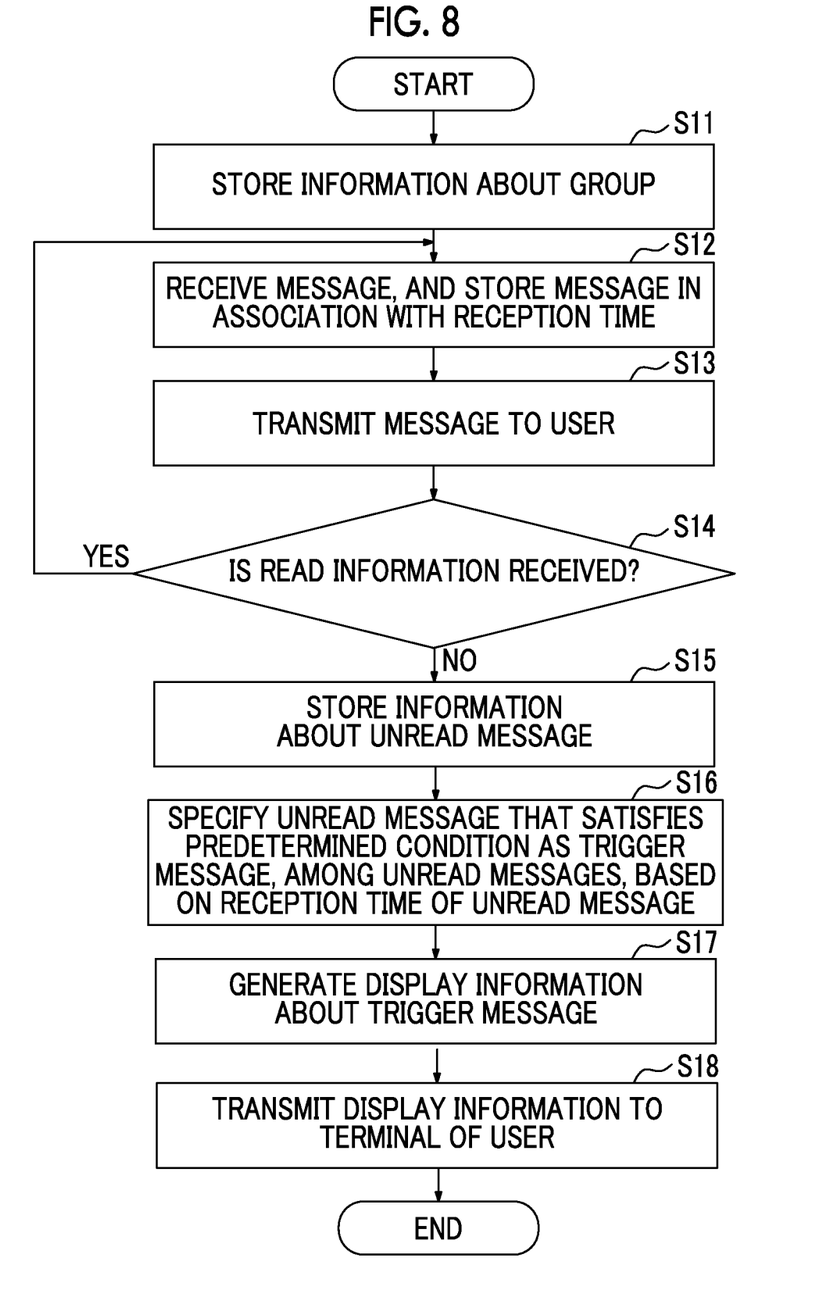
FIG. 8 is an example of a control method for an information processing device according to the embodiment of the present invention.

A control method according to an embodiment of the present invention described above will be described with reference to FIG. 8. FIG. 8 is a flowchart of the above-described control method.

First, information about the group is stored in the storage unit 130 of the server 100 (step S11). The reception unit 111 receives a message addressed to a group that is transmitted from another user constituting the group, and the storage unit 130 stores the reception time of the message in association with the message (step S12). Then, the transmission unit 112 transmits the message to the user A (step S13). Thereafter, the determination unit 121 determines whether or not the read information has been received, for the message transmitted to the user A (step S14). In a case where it is determined by the determination unit 121 that the read information is received, the process returns to step S12, and the transmission and reception of a message (relay of communication between terminals) are continued. In a case where it is determined by the determination unit 121 that the read information is not received, the control unit 120 stores the information regarding the unread message in the storage unit 130 (step S15).

Thereafter, the specification unit 122 specifies the unread message satisfying a predetermined condition, among the unread messages, as a trigger message, based on the reception time of the unread message stored in the storage unit 130 (step S15). Thereafter, the generation unit 123 generates the display information regarding the trigger message (step S17). This is the display information for displaying the trigger message display on the terminal device of the user. Thereafter, the transmission unit 112 transmits the generated display information to the terminal device of the user (step S18).

In addition, the trigger message specification by the specification unit 122 in step S16 may be performed each time when the reception unit 111 receives a message, or may be performed after the information on the unread message is stored in the storage unit 130 to some extent.

The effect of the present invention will be described again. According to an embodiment of the present invention, in a case where there is an unread message that the user does not check, the information about the unread message having a high degree of importance, which triggers the users in the group to frequently exchange conversations is presented to the user. Therefore, the user can determine which message is to be preferentially checked, in a checking job of a message that requires time, and use time effectively.

Furthermore, according to an embodiment of the present invention, it is possible to specify a trigger message having a high checking priority, by a more simple calculation process using the reception time of a message.

Furthermore, according to an embodiment of the present invention, it is possible to specify a trigger message, by a more simple process in which the loads of the determination process are reduced, in the process using the reception of a message.

Although an embodiment of the invention according to the present invention has been described, the present invention is of course not limited thereto. For example, the predetermined number and the predetermined time, which are described above, are merely examples, and another number may be used. Further, the invention may also be realized by combining the respective embodiments.

Further, the trigger message display to be displayed on the terminal device may be displayed with different display modes depending on the priority. For example, the generation unit 123 may display a colored trigger message display, and may generate the display information so as to make the color darker, depending on the number of messages which are received within a predetermined time (for example, 3 minutes), after a specified trigger message. Furthermore, the user who writes the trigger messages many times in the group is stored in the storage unit 130 as an important user, and the statement by the important user may be displayed with a preset color. Thus, the user can immediately estimate the type of the trigger message.

Incidentally, even though a particular friend relationship is not set between users, it is possible to form the same group. Therefore, for example, a particular friend relationship is not been set between the user A and the user B that are included in the same group in some cases. Here, in the user included in the group, the user for which many users are set as friends is considered to have a high importance degree in the group. Thus, the user in the group ranked according to the number of users for which the friend relationship is set with the user in the group is stored in the storage unit 130, and the statement of a high ranked user may be specified as a trigger message by the specification unit 122. Thus, many users in the group are set to have a friend relationship, and the message that is considered to be focused on by many users in the group can be specified as a trigger message.

In addition, the generation unit 123 generates display information for displaying a notification recommending the user to become a friend, for the users who are not in a friend relationship with the user who speaks the message that has been specified as a trigger message, and the display information may be sent to the users.

Incidentally, a specifying process of the trigger message may be performed at a timing at which messages by a predetermined number or more of other users included in the group are included in the unread message of the user. Thus, the message having a high priority that is focused on by large number of users in the group can be specified as a trigger message.

Further, the display of the trigger message may be performed by, for example a push notification, or the like, or may be displayed first, when the user has launched the message application.

Further, the terminal device is not limited to smart phones. The terminal device may be any device insofar as the device is an information processing device which can realize functions described in the above embodiment, and may be, for example, notebook computers, smart phones, tablet terminals, mobile phones, wearable terminals (including types of eyeglasses, watches, or the like), or a desktop personal computer (PC).

Each function unit of the server 100 may be realized by a logical circuit (hardware) that is formed by (integrated circuit (IC) chips, a large scale integration (LSI)), or the like, or a dedicated circuit, or may be realized by software using a central processing unit (CPU). Each function unit may be realized by one or a plurality of integrated circuits, or the functions of a plurality of function units may be realized by a single integrated circuit. LSI may be referred to as a VLSI, a super LSI, an ultra LSI, or the like, depending on the degree of integration.

In a case where each function unit of the server 100 is realized by software, the server 100 or the terminal device 200 includes, a CPU that executes instructions of a program which is software for realizing each function, a read only memory (ROM) or a storage device (referred to as "recording medium") in which the above program and various types of data are recorded in a computer (or a CPU) readable manner, a random access memory (RAM) for developing the above program, and the like. Then, an object of the present invention is achieved, by the computer (or the CPU) reading and executing the program from the recording medium. As the recording medium, "tangible medium which is not temporary", for example, a tape, a disk, a card, a semiconductor memory, a programmable logic circuit, or the like can be used. Further, the search program may be supplied to the computer through any transmission medium (communication networks, broadcast waves, and the like) capable of transmitting the search program. The present invention can also be realize in the form of a data signal included in a carrier wave, in which the above search program is embodied by electronic transmission.

Specifically, a program according to an embodiment of the present invention realizes a reception function, a memory function, a transmission function, a specification function, and a generating function in the information processing device (server 100). The reception function, the memory function, the transmission function, the specification function, and the generating function can be respectively realized by the reception unit 111, the storage unit 130, the transmission unit 112, the specification unit 122, and the generation unit 123, which are described above.

In addition, the program can be realized by using a script language such as ActionScript, and JavaScript (registered trademark), an object oriented programming language such as Objective-C and Java (registered trademark), a markup language such as HTML5, and the like.

While the present invention has been described based on various drawings and embodiments, it should be noted that it is easy to make various changes and modifications based on the present disclosure by those skilled in the art. Therefore, these changes and modifications are intended to be included within the scope of the present invention. For example, the respective units and the functions or the like included in each step and the like are repositionable so as not to be logically inconsistent, and a plurality of means, steps, and the like can be combined into one, or can be divided. In addition, it is also possible to combine configurations indicated in the above embodiment as appropriate.

What is claimed is:

1. An information processing device, comprising:
    a receiver configured to receive messages addressed to a plurality of users constituting a group, from terminals of the plurality of users constituting the group;
    a storage configured to store reception times of the messages which are received by the receiver, in association with the messages;
    a transmitter configured to transmit the messages to a terminal of at least one user included in the group; and
    a processor configured to,
        calculate reception time differences between respective pairs of consecutive messages included in groups of the messages, each of the groups of the messages including a first message and a second message, the first message and the second message being consecutive messages, a reception time difference being a time difference between reception of the first message and reception of the second message, specify at least one unread message, from among a plurality of consecutive unread messages, that satisfies a condition as a trigger message based on the reception time differences, the plurality of consecutive unread messages included in the messages and being ones for which read information is not received from the terminal of the user included in the group, the read information indicating that a message has been viewed, and generate display information including the trigger message on a display of the terminal of the user, wherein the transmitter is further configured to transmit the display information that is generated by the processor to the terminal of the user included in the group.

2. The information processing device according to claim 1, wherein the processor is further configured to, calculate a first average value and a second average value, the first average value being average value of first reception time differences between respective pairs of consecutive messages in a first group of the messages received before an unread message and the second average value being an average value of second reception time differences between respective pairs of consecutive messages in a second group of the messages received after the unread message, for each of the plurality of consecutive unread messages, and specify at least one unread message for which the first average value is greater than the second average value and a difference between the first average value and the second average value is the largest value as the trigger message.

3. The information processing device according to claim 1, wherein the processor is further configured to, calculate a first average value and a second average value, the first average value being an average value of first reception time differences between respective pairs of consecutive messages in a first group of the messages received before an unread message and the second average value being an average value of second reception time differences between respective pairs of consecutive messages in a second group of the messages received after the unread message, for each of the plurality of consecutive unread messages, and specify at least one unread message for which a ratio of the second average value relative to the first average value is the smallest value as the trigger message.

4. The information processing device according to claim 1, wherein the processor is further configured to, calculate a ratio of a number of messages that are received within a time after receiving an unread message relative to the number of messages that are received within a time before receiving the unread message, for each of the plurality of consecutive unread messages, and extract at least one unread message for which the ratio is the smallest value as the trigger message.

5. The information processing device according to claim 1, wherein the storage is further configured to store information on a specific user who transmits a specific message, in association with the specific message, and wherein the processor is configured to specify one message, from among a subset of the plurality of consecutive unread messages that are transmitted consecutively from a same user, as the trigger message.

6. A control method for an information processing device, the control method comprising:

receiving messages addressed to a plurality of users constituting a group, from terminals of the plurality of users constituting the group;

storing reception times of the messages which are received in the receiving, in association with the messages;

transmitting the messages to a terminal of at least one user from among the plurality of users included in the group;

calculating reception time differences between respective pairs of consecutive messages included in groups of the messages, each of the groups of the messages including a first message and a second message, the first message and the second message being consecutive messages, a reception time difference being a time difference between reception of the first message and reception of the second message;

specifying, by a processor, at least one unread message, from among a plurality of consecutive unread messages, that satisfies a condition as a trigger message based on the reception time differences, the plurality of consecutive unread messages included in the messages and being ones for which read information is not received from the terminal of the user included in the group, the read information indicating that a message has been viewed;

generating, by the processor, display information including the trigger message on a display of the terminal of the user; and transmitting the display information that is generated in the generating to the terminal of the user included in the group.

7. The control method according to claim 6, wherein the specifying includes, calculating a first average value and a second average value, the first average value being an average value of first reception time differences between respective pairs of consecutive messages in a first group of the messages received before an unread message, and the second average value being an average value of second reception time differences between respective pairs of consecutive messages in a second group of the messages received after the unread message, for each of the plurality of c unread messages, and specifying at least one unread message for which the first average value is greater than the second average value, and a difference between the first average value and the second average value is the largest value as the trigger message.

8. The control method according to claim 6, wherein the specifying includes, calculating a first average value and a second average value, the first average value being an average value of first reception time differences between respective pairs of consecutive messages in a first group of the messages received before an unread message and second average value being an average value of second reception time differences between respective pairs of consecutive messages in a second group of the messages received after the unread message are calculated for each of the plurality of consecutive unread messages, and specifying at least one unread message, for which a ratio of the second average value relative to the first average value is the smallest value, as the trigger message.

9. The control method according to claim 6, wherein the specifying includes, calculating a ratio of a number of messages that are received within a time after receiving an unread message relative to a number of messages that are received within time before receiving the unread message for each of the plurality of consecutive unread messages, and specifying at least one unread message for which the ratio is the smallest value as the trigger message.

10. The control method according to claim 6, wherein the storing further includes storing information on a specific user who transmits a specific message, in association with the specific message, and wherein the specifying further includes specifying one message, from among a subset of the plurality of consecutively unread messages that are transmitted consecutive from a same user, as the trigger message.

11. A non-transitory computer readable recording medium storing a computer program for execution by a processor that when executed by the processor to causes the processor to perform:

receiving messages addressed to a plurality of users constituting a group from terminals of the plurality of users constituting the group;

storing reception times of the messages which are received in the receiving, in association with the messages;

transmitting the messages to a terminal of at least one user included in the group;

calculating reception time differences between respective pairs of consecutive messages included in groups of the messages, each of the groups of the messages including a first message and a second message, the first message and the second message being consecutive messages, a reception time difference being a time difference between reception of the first message and reception of the second message;

specifying at least one unread message, from among a plurality of consecutive unread messages, that satisfies a condition as a trigger message based on the reception time differences, the plurality of consecutive unread messages included in the messages and being ones for which read information is not received from the terminal of the user included in the group, the read information indicating that a message has been viewed;

generating display information including the trigger message on a display of the terminal of the user; and transmitting display information that is generated by the generating to the terminal of the user included in the group.

12. The information processing device according to claim 1, wherein the transmitter is further configured to cause the display information to be displayed first in response to launching a message application on the terminal of the user.

13. The control method according to claim 6, wherein the transmitting the display information includes causing the display information to be displayed first in response to launching a message application on the terminal of the user.

14. The non-transitory computer readable recording medium according to claim 11, wherein the processor is configured to cause the display information to be displayed first in response to launching a message application on the terminal of the user.

* * * * *